Figure 1:
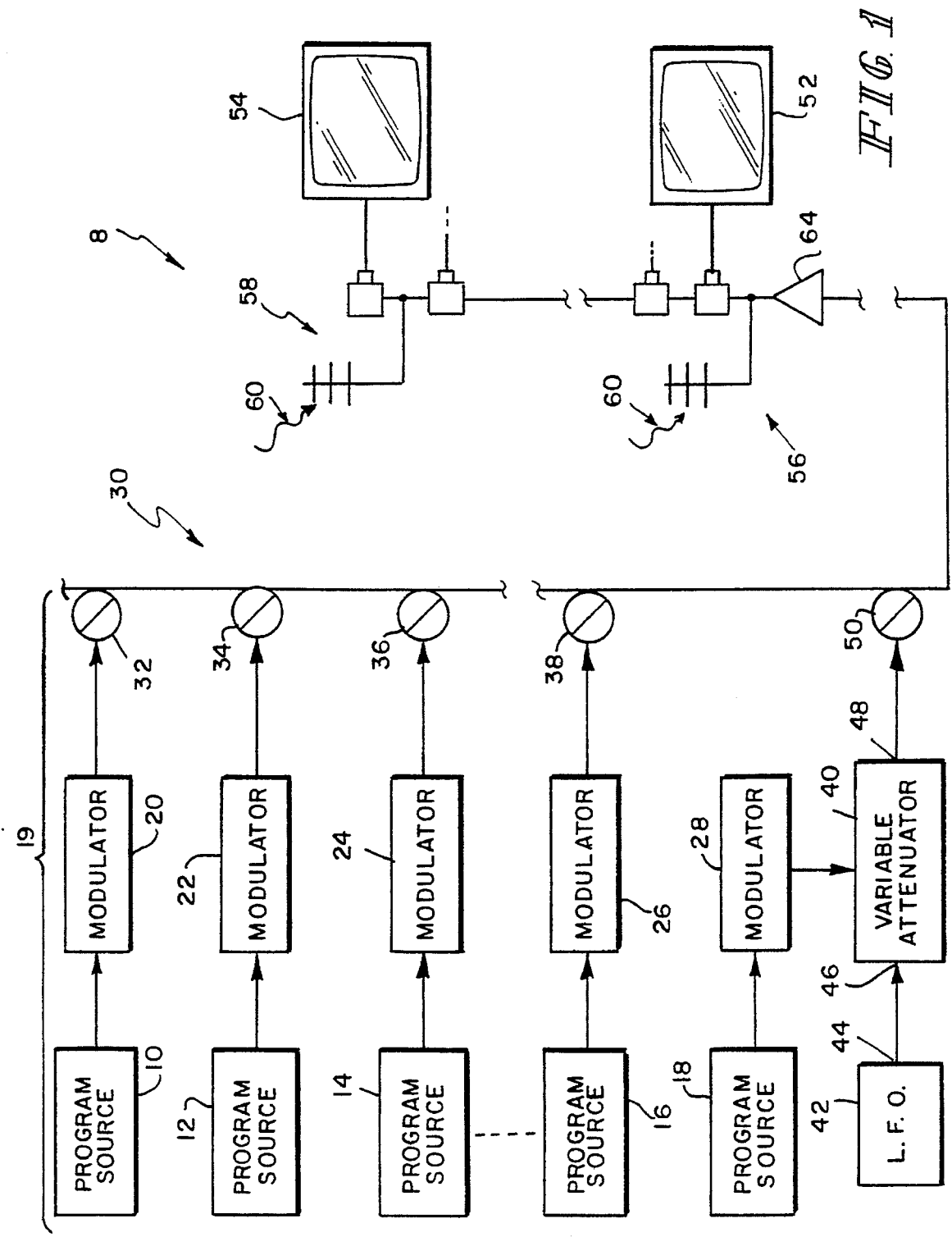

United States Patent [19]
Bush

[11] Patent Number: 5,608,428
[45] Date of Patent: Mar. 4, 1997

[54] RADIO FREQUENCY LEAKAGE DETECTION SYSTEM FOR CATV SYSTEM

[75] Inventor: Terry W. Bush, Greenwood, Ind.

[73] Assignee: Trilithic, Inc., Indianapolis, Ind.

[21] Appl. No.: 257,198

[22] Filed: Jun. 9, 1994

[51] Int. Cl.⁶ ..................................................... H04N 7/10
[52] U.S. Cl. .............................. 348/6; 348/192; 348/180; 455/3.1
[58] Field of Search ............................... 348/6, 192, 193, 348/13, 180; 455/6.1, 14, 3.1; 333/237

[56] References Cited

U.S. PATENT DOCUMENTS

| | | | |
|---|---|---|---|
| 4,072,899 | 2/1978 | Shimp | 455/4.1 |
| 4,237,486 | 12/1980 | Shimp | 348/475 |
| 5,321,089 | 6/1994 | Lemson | 455/67.1 |

OTHER PUBLICATIONS

Characterization of Cable TV Networks as the Transmission Media for Data, IEEE Journal vol. SAC-3, No. 2, Mar. 1985.

*Primary Examiner*—Victor R. Kostak
*Assistant Examiner*—Martha J. Hopkins
*Attorney, Agent, or Firm*—Barnes & Thornburg

[57] ABSTRACT

A communication circuit comprises a plurality of sources of program material, and a plurality of modulators for supplying a plurality of carrier frequency signals. Each modulator is modulated by a respective one of the sources of program material. Each of the program material sources is coupled to a respective modulator. The program material-modulated carrier frequencies are coupled in the circuit. Terminal apparatus is provided for demodulating at least one of the program material-modulated carrier frequency signals. The terminal apparatus includes automatic gain control (AGC) circuitry having an AGC bandwidth. The terminal apparatus is coupled to the circuit. One of the program material-modulated carrier frequencies is coupled in the circuit through a variable attenuator having an attenuator control signal input, a program material-modulated carrier frequency input, and a variably attenuated program material-modulated carrier frequency output. An oscillator generates at an oscillator output a signal having a frequency within the AGC bandwidth. Said one of the program material modulated carrier frequencies is coupled to the program material-modulated carrier frequency input. The oscillator output is coupled to the attenuator control signal input. The variably attenuated program material-modulated carrier frequency output is coupled in the circuit.

28 Claims, 4 Drawing Sheets

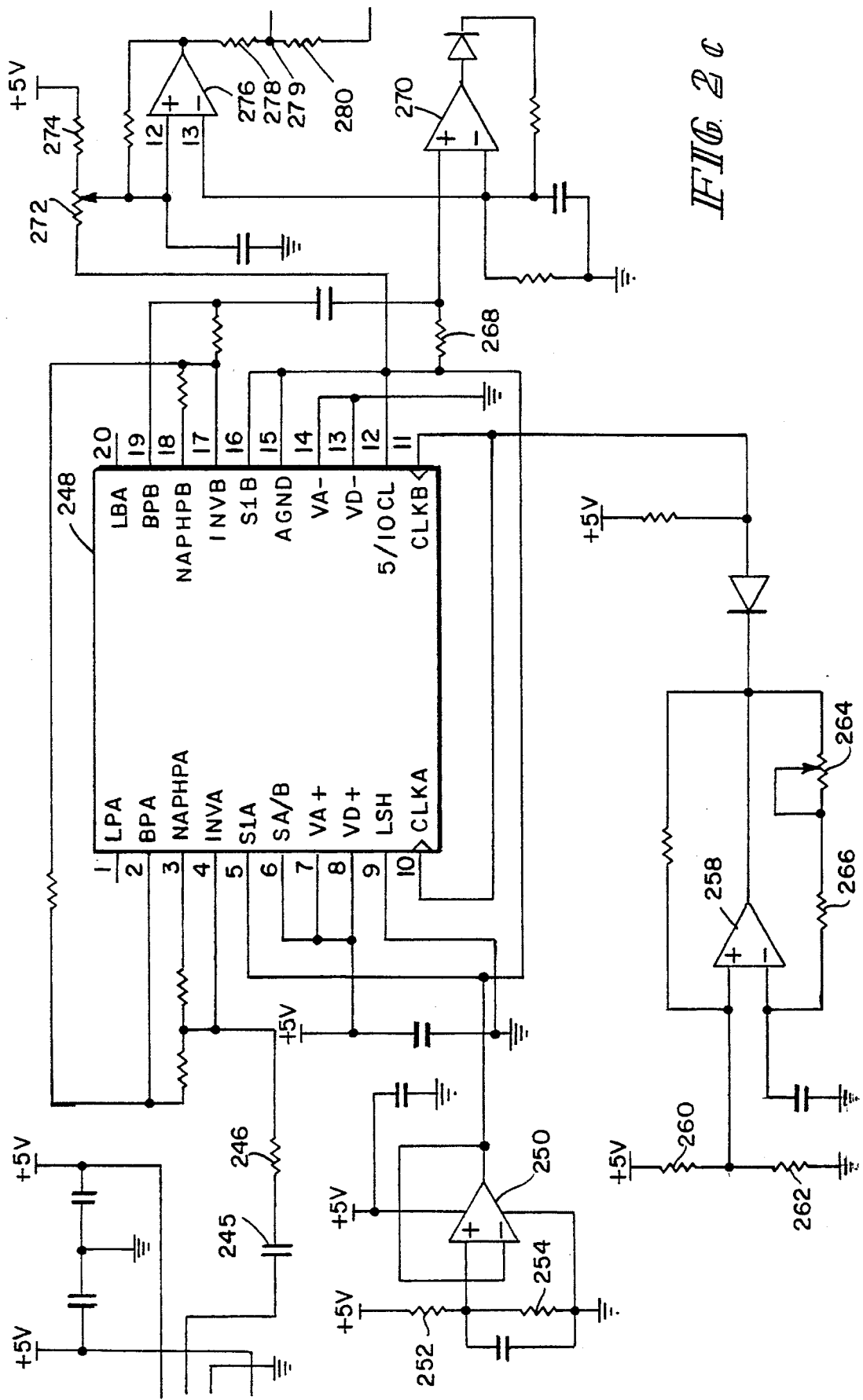

5,608,428

RADIO FREQUENCY LEAKAGE DETECTION SYSTEM FOR CATV SYSTEM

This invention relates to the detection of electromagnetic radiation leakage, either egress from or ingress into communication circuits. It is disclosed in the context of detecting leaks in CATV systems, but it is believed to be useful in other applications as well.

Leaks in CATV circuits typically serve both as radiators for the egress of RF energy from the CATV system and as receivers for the ingress of RF energy into the system. Thus it is important to identify and locate such leaks, not only because the RF energy which would otherwise be available to subscribers can escape the circuit, but also because RF signals of all kinds of extraneous sources such as broadcast, two-way radio and so on are constantly impinging upon the circuit, and thus can affect transmission through the circuit. Even assuming uniform field strength along the circuit from such an extraneous source, substantially different effects can be witnessed by subscribers. For example, subscribers closer to the head end of the circuit or an intervening amplifier will have relatively higher circuit signal-to-leakage noise ratios. Their receivers ordinarily will experience less difficulty recovering the program material from the circuit channels to which their receivers are tuned. As one moves further from the head end of the circuit or from any intervening repeater amplifier, however, the attenuation of the signals on the circuit increases. At some distance from the head end or the intervening repeater, the circuit signal-to-leakage noise ratio becomes sufficiently small that it may become impossible to recover the program material on the circuit channel from the ingressing leakage.

On the egressing leakage side, where there is no overbuilding, that is, where there are not multiple CATV systems lying closely adjacent each other, it may not be a problem for prior art leak detectors to detect egressing RF energy, and identify its location so that repairs can be effected. However, where multiple CATV systems are overbuilt, the source of an RF leak cannot ordinarily be ascertained even though an RF leak is detected unless each system is carrying a unique carrier. In the prior art, U.S. Pat. No. 4,072,899 solved this problem by placing on a particular circuit a carrier modulated by a unique audio tone. Detection of the unique audio tone meant that the leak had been isolated to that particular circuit. However, the carrier modulated by the unique audio tone occupied circuit bandwidth which otherwise could be occupied by a carrier modulated by program material.

Additionally, the sensitivity of such prior art systems to low leakage levels has not proven to be great enough to detect leaks that would affect certain kinds of circuit communications. For example, it is not believed that such prior art RF leakage detection schemes are sufficiently sensitive to detect leaks in 64 quadrature amplitude modulated (64 QAM) compressed digital transmission circuits to avoid disastrous disruptions, for example, loss of image for up to fifty percent of the time, resulting from low level RF leakage ingress into such circuits.

The system of the present invention is sensitive enough for such RF leak detection schemes and applications. With the present invention, revenue generating circuit bandwidth does not have to be employed to tag a particular circuit with a circuit identifier. The increased system sensitivity of the present invention means that the CATV circuit operator either can place a much lower power level tag on his circuit or, alternatively, can detect lower level leaks or detect leaks from much greater distances from the circuit than with prior art systems.

According to the invention, a communication circuit comprises a plurality of sources of program material, and a plurality of modulators for supplying a plurality of carrier frequency signals, each for modulation by a respective one of the sources of program material. Means are provided for coupling each of the program material sources to a respective modulator, and for coupling the program material-modulated carrier frequencies in the circuit. Terminal apparatus is provided for demodulating at least one of the program material-modulated carrier frequency signals. The terminal apparatus includes automatic gain control (AGC) means having an AGC bandwidth. Means couple the terminal apparatus to the circuit. The means for coupling one of the program material-modulated carrier frequencies in the circuit comprises a variable attenuator having an attenuator control signal input, a program material-modulated carrier frequency input, and a variably attenuated program material-modulated carrier frequency output. An oscillator generates at an oscillator output a signal having a frequency within the AGC bandwidth. Means couple said one of the program material modulated carrier frequencies to the program material-modulated carrier frequency input. Means couple the oscillator output to the attenuator control signal input. Means couple the variably attenuated program material-modulated carrier frequency output in the circuit.

According to an illustrative embodiment, a detector is provided for receiving a signal representative of the detected leakage, for extracting from the signal representative of the detected leakage the variably attenuated program material-modulated carrier frequency, for detecting in the variably attenuated program material-modulated carrier frequency the oscillator output signal frequency, and for producing an indication of detection of the oscillator output signal frequency.

Illustratively, the oscillator output signal frequency is less than about 35 Hz, for example in the range of from about 5 Hz to about 15 Hz.

According to an illustrative embodiment, the communication circuit comprises a CATV circuit and the terminal apparatus comprises at least one television receiver.

Figure 2A:
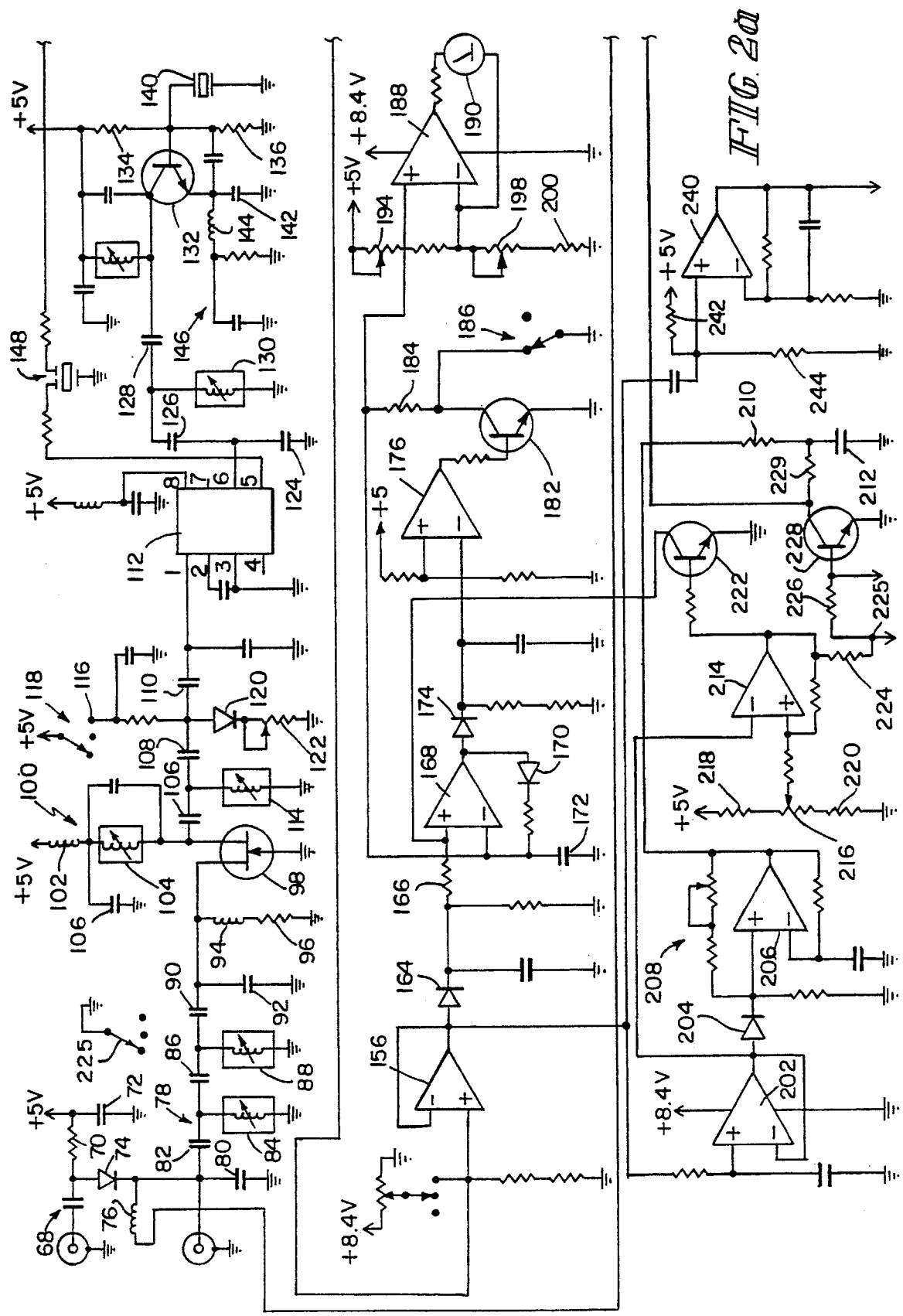
Figure 2B:
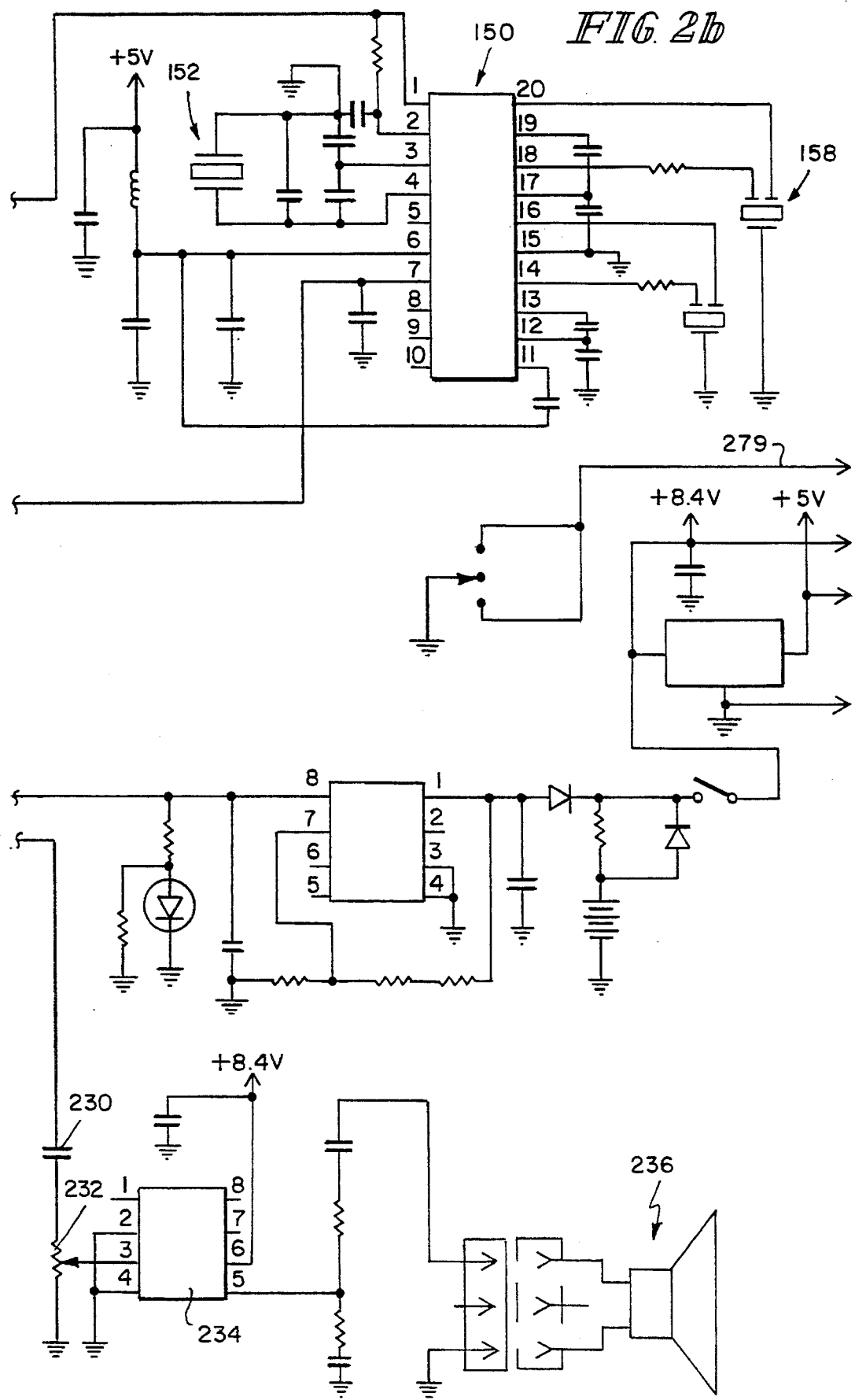

The invention may best be understood by referring to the following description and accompanying drawings which illustrate the invention. In the drawings:

FIG. 1 illustrates a block diagram of a CATV system constructed according to the present invention; and, FIGS. 2a–c illustrate in schematic form an RF leak detector constructed according to the present invention.

The following schematic and block circuit diagram descriptions identify specific integrated circuits and other components and in many cases specific sources for these. Specific terminal and pin names and numbers are generally given in connection with these for the purposes of completeness. It is to be understood that these terminal and pin identifiers are provided for these specifically identified components. It is to be understood that this does not constitute a representation, nor should any such representation be inferred, that the specific components or sources are the only components available from the same or any other sources capable of performing the necessary functions. It is further to be understood that other suitable components available from the same or different sources may not use the same terminal/pin identifiers as those provided in this description.

A CATV system 8 according to the present invention is illustrated in highly schematic block diagram form in FIG. 1. Several program sources 10, 12, 14, . . . 16, 18 such as satellite links, VCR's and the like at a head end 19 of the CATV system 8 are coupled to input ports of respective modulators 20, 22, 24, . . . 26, 28. The modulators modulate the source signals into channels for placement on a CATV circuit 30. The output ports of channel modulators 20, 22, 24, ... 26 are coupled through respective power couplers 32, 34, 36, ... 38 to circuit 30. The output port of an arbitrary one, 28, of the channel modulators, however, is coupled to an input port of a variable attenuator 40. A low (here, subsonic) frequency oscillator 42 has an output port 44 on which appears a subsonic frequency signal in the range of, for example, 7 Hz–10 Hz. This signal is coupled from port 44 to a control input port 46 of variable attenuator 40.

An output port 48 of variable attenuator 40 is coupled through a power coupler 50 to circuit 30. In this way, the subsonic frequency signal from oscillator 42 is placed on circuit 30 without occupying otherwise revenue-producing bandwidth of the circuit. The percentage modulation produced by variable attenuator 40 in the output signal from modulator 28 is very low, typically under 20%, which results in only about 2 dB or so of modulation of the source 18 signal applied to circuit 30. However, because the modulating frequency is so low, and particularly because that frequency is well within the automatic gain control (AGC) bandwidth of all of the television receivers of subscribers 52, ... 54 along circuit 30, that frequency does not affect the operation of receivers 52, ... 54.

The detection of the oscillator 42 frequency in circuit 30 can best be understood by first assuming that circuit 30 contains a leak 56, illustrated as an antenna for purposes which will become clear, along its length nearer head end 19 and a leak 58 along its length more remote from head end 19. Leaks 56, 58 typically serve both as radiators for the egress of RF energy from CATV system 8 and as receivers for the ingress of energy into CATV system 8. Thus it is important to identify and locate such leaks 56, 58 not only because the RF energy which would otherwise be available to subscribers 52, ... 54 can escape the circuit 30 but also because RF signals 60 of all kinds from all kinds of extraneous sources such as broadcast, two-way radio and so on are constantly impinging upon circuit 30. Even assuming that the field strengths at circuit 30 from such extraneous sources are generally the same at all points along the length of circuit 30, substantially different effects can be witnessed by subscribers 52, ... 54. Subscriber 52, for example, is closer to head end 19 or to an intervening line amplifier, or repeater, 64. Therefore the circuit 30 signal-to-received noise 60 ratio is relatively higher for subscriber 52 and his receiver has relatively less difficulty recovering the program material from the circuit 30 channel 20, 22, 24, ... 26, 28 to which his receiver is tuned. At subscriber 54's receiver, however, the effect can be quite different, owing to the attenuation of the signals on circuit 30 as distance from the head end 19 or any intervening repeater 64 increases. At some point along this length, the circuit 30 signal-to-received noise 60 ratio becomes sufficiently small that it may become impossible to recover the program material on the circuit 30 channel 20, 22, 24, ... 26, 28 from the noise 60.

Where there is no overbuilding, that is, where there are not multiple CATV systems lying closely adjacent each other, it may not be a problem for prior art leak detectors to detect leaking RF energy, and identify its location so that repairs can be effected. However, where multiple CATV systems are overbuilt, the source of an RF leak cannot ordinarily be ascertained even though an RF leak is detected. In the prior art, U.S. Pat. No. 4,072,899 solved this problem by placing on the circuit 30 a carrier modulated by a unique audio tone. Detection of unique audio tone meant that the leak had been isolated to that particular circuit 30. However, the carrier modulated by the unique audio tone took up frequency "space" on the circuit 30 bandwidth which otherwise could be sold, that is occupied by a channel modulated by program material.

Additionally, the sensitivity of such prior art systems to low leakage levels has not proven to be great enough to detect leaks that would affect certain kinds of circuit 30 communications. For example, it is not believed that such prior art circuit 30 RF leakage detection schemes are sufficiently sensitive to detect leaks in 64 quadrature amplitude modulated (64 QAM) compressed digital transmission circuits 30 to avoid disastrous disruptions resulting from low level signal 60 ingress into such circuits 30. The system of the present invention is sensitive enough for such RF leak detection schemes and applications. The increased system sensitivity with the present invention means that the CATV circuit 30 operator can place a much lower power level tag on his circuit 30, or can detect lower power leaks 56, 58, or can detect leaks 56, 58 at much greater distances than with prior art systems. The present invention also means that revenue-generating circuit 30 bandwidth does not have to be employed to tag a particular circuit 30 with a circuit 30 identifier.

The detection system of the present invention will now be discussed with particular reference to FIGS. 2a–c. FIG. 2a illustrates to a substantial extent a presently commercially available SEARCHER+ leak detector available from Trilithic Inc., 9202 East 33rd Street, Indianapolis, Ind. 46236. Energy is coupled from an RF leak, 58 for example, through a front panel (FP) antenna, a 1000 pF capacitor 68, a 2.2 KΩ resistor 70 and a 0.1 µF capacitor 72 to the leak detector ground. The common terminal of resistor 70 and capacitor 72 is coupled to +5 VDC supply. The common terminal of capacitor 68 and resistor 70 is coupled to the anode of a type BA682 diode 74. Alternatively, the RF leak energy can be coupled through a rear panel (RP) antenna to the cathode of diode 74. The cathode of diode 74 is coupled to a terminal of a 2.2 µH inductor 76, and to a multiple section LC filter 78. Filter 78 includes a 27 pF capacitor 80 coupled to ground, a series 4.7 pF capacitor 82 and tunable 7½ turn, 259 nH≦L≦305 nH inductor 84 coupled in parallel with capacitor 80, a series 0.33 pF capacitor 86 and a tunable 7½ turn, 259-to-305 nH inductor 88 coupled in parallel with inductor 84, a series 3.9 pF capacitor 90 and 27 pF capacitor 92 coupled in parallel with inductor 88. A series 2.2 µH inductor 94 and 180 Ω resistor 96 are coupled in parallel with capacitor 92.

The filter 78 output appearing across capacitor 92 and the series components 94, 96 is applied across the Source and Gate terminals of a type MMBFJ310 JFET 98. The gate of FET 98 is grounded. Its Drain is coupled through a tuned tank circuit 100 to +5 VDC. Circuit 100 includes a 2.2 µH inductor 102 and a tunable 7½ turn, 259-to-305 nH inductor 104 in series between +5 VDC and the drain terminal of FET 98. A 0.01 µF capacitor 106 is coupled between the common terminal of inductors 102, 104 and ground. A 1.5 pF capacitor is coupled in parallel with inductor 104. The drain terminal of FET 98 is coupled through series 0.33 pF, 5.6 pF and 1000 pF capacitors 106, 108, 110, respectively, to an input terminal, pin 1, of a Signetics NE602D double-balanced mixer/oscillator integrated circuit 112.

The common terminal of capacitors 106, 108 is coupled through a tunable 7½ turn, 259-to-305 nH inductor 114 to ground. The common terminal of capacitors 108, 110 is coupled through a 1 KΩ resistor to the X10 attenuation terminal 116 of a double pole, three position switch 118. A 1000 pF capacitor is coupled between terminal 116 and ground. The anode of a type BA 682 diode 120 is coupled to the common terminal of capacitors 108, 110. The cathode of diode 120 is coupled through a 50 Ω attenuation-setting potentiometer 122 to ground. A 12 pF capacitor is coupled across pin 1 of mixer IC 112 and ground. A 1000 pF capacitor is coupled across an input terminal, pin 21, of IC 112 and ground. Pin 3 of IC 112 is coupled to ground. The Vcc terminal, pin 8, of IC 112 is coupled through a 2.2 µH inductor to +5 VDC and through a 0.01 µF capacitor to ground. The oscillator terminal, pin 6, of IC 112 is coupled to the common terminal of a 39 pF capacitor 124 and a 5.6 pF capacitor 126. The remaining terminal of capacitor 124 is grounded. The remaining terminal of capacitor 126 is coupled to a terminal of a 0.33 pF capacitor 128 and a terminal of a tunable 7½ turn, 259-to-305 nH inductor 130. The remaining terminal of inductor 130 is coupled to ground. The remaining terminal of capacitor 128 is coupled to the collector of a type MMBT 4124 NPN transistor 132.

The collector of transistor 132 is coupled through a parallel LC filter comprising a 3.9 pF capacitor and a tunable 7½ turn, 259-to-305 nH inductor to +5 VDC. +5 VDC is coupled through a voltage divider including a 10 KΩ resistor 134 and a 4.7 KΩ resistor 136 to ground. The common terminal of resistors 134, 136 is coupled to the base of transistor 132 and to one terminal of a channel 28 frequency crystal 140, the other terminal of which is coupled to ground. A filter on the emitter of transistor 132 includes a 39 pF capacitor 142 to ground, and a 39 pF capacitor providing feedback to the base of transistor 132. A 1 µH inductor 144 is coupled between the emitter of transistor 132 and a parallel RC circuit 146 including a 270 Ω resistor and a 680 pF capacitor. The other terminal of circuit 146 is coupled to ground. The output terminal, pin 5, of mixer IC 112 is coupled through a 560 Ω resistor to an input terminal of a 10.7 MHz IF crystal filter 148. The output terminal of crystal filter 148 is coupled through a 560 Ω resistor to an RF input terminal, pin 1, of a Signetics type SA 605 mixer/FM IF integrated circuit 150.

Pin 2, the RF bypass input of IC 150, is coupled through a 0.01 µF capacitor to ground and through a 3.9 KΩ resistor to pin 1 thereof. A 10.245 MHz crystal 152 is coupled across a crystal oscillator input terminal, pin 4, of IC 150 and ground. A 27 pF capacitor is coupled across crystal 152. Pin 3 of IC 150 is coupled to ground through a 100 pF capacitor, and to pin 4 through a 39 pF capacitor. Pin 6, the Vcc input, of IC 150 is coupled through a 100 µH inductor to +5 VDC and through the parallel combination of a 47 µF capacitor and a 0.1 µF capacitor to ground. The Received Signal Strength Indicator output, pin 7, of IC 150 is coupled to a non-inverting (+) input terminal of a National Semiconductor type LM 324 comparator 156 configured as a non-inverting unity gain buffer. A 0.0047 µF capacitor is coupled across pin 7 and ground. The mixer output terminal, pin 20, of IC 150 is coupled to an input terminal of a 455 KHz crystal filter 158. An output terminal of filter 158 is coupled through a 470 Ω resistor to the IF amplifier input terminal, pin 18, of IC 150. The IF amp output terminal, pin 16, of IC 150 is coupled to an input terminal of a 455 KHZ crystal filter 160, an output terminal of which is coupled through a 1.8 KΩ resistor to the limiter input terminal, pin 14, of IC 150.

The limiter output terminal, pin 11, of IC 150 is coupled through a 1000 pF capacitor to its Vcc terminal. Pins 17 and 19, the IF amp decoupling terminals, of IC 150 are coupled together through a 0.1 µF capacitor. Pin 17 of IC 150 is also coupled to ground through a 0.1 µF capacitor. Pin 15, the GrouND terminal of IC 150, is coupled to ground. Pins 12 and 13, the limiter decoupler terminals of IC 150, are coupled together through a 0.1 µF capacitor and pin 12 is also coupled to ground through a 0.1 µF capacitor.

The + input terminal of comparator 156 is coupled through 87.6 KΩ resistance to ground. The output terminal of comparator 156 is coupled to the anode of a 1N4148 diode 164, the cathode of which is coupled through a 10 KΩ resistor 166 to the + input terminal of an LM 324 comparator 168 in an envelope detector circuit. A parallel RC circuit including a 10 µF capacitor and a 1 KΩ resistor is coupled across the common terminal of diode 164 and resistor 166 and ground. The output terminal of comparator 168 is coupled to the anode of a 1N4148 diode 170 the cathode of which is coupled through a 1 KΩ resistor to the inverting (−) input terminal of comparator 168. A 10 µF capacitor 172 is coupled between the − input terminal of comparator 168 and ground. The output terminal of comparator 168 is also coupled to the anode of a 1N4148 diode 174, the cathode of which is coupled to the − input terminal of an LM 324 comparator 176. The − input terminal of comparator 176 is also coupled through a parallel RC circuit including 4.4 MΩ resistance and a 0.47 µF capacitor to ground.

A diode 174 compensation threshold is established on the + input terminal of comparator 176 by a resistive 11:1 voltage divider including a 47 KΩ resistor 178 and a 4.7 KΩ resistor 180. The output terminal of comparator 176 is coupled through a 10 KΩ resistor to the base of a type MMBT 3904 NPN transistor 182. The emitter of transistor 182 is grounded. The collector of transistor 182 is coupled through a 470 KΩ load resistor 184 to the − input terminal of comparator 168.

A NORMal-HOLD SPDT switch 186 has its movable contact grounded, its NORMal contact coupled to the collector of transistor 182 and its HOLD contact not connected. In the NORMal position, switch 186 thus slowly discharges capacitor 172 through resistor 184. In the HOLD orientation of switch 186, capacitor 172 can only discharge through resistor 184 and transistor 182. In either event, the envelope signal across capacitor 172 is coupled to the + input terminal of an LM 324 comparator 188, the output terminal of which is coupled through a 1 KΩ resistor to a terminal of a signal strength meter 190. The remaining terminal of meter 190 is coupled to the − input terminal of comparator 188. A series string of a 20 KΩ meter zeroing potentiometer 194, a 6.81 KΩ resistor 196, a 1 KΩ meter gain potentiometer 198, and a 1.87 KΩ, 1% resistor 200 is coupled between +5 VDC and ground. The common terminal of resistor 196 and potentiometer 198 is coupled to the − input terminal of comparator 188.

The output terminal of comparator 156 is also coupled through a 10 KΩ resistor to the + input terminal of an LM 324 comparator 202 in an audio frequency VCO. Comparator 202 is also configured as a unity gain buffer. The + input terminal of comparator 202 is coupled to ground through a 10 µF capacitor. The anode of a 1N4148 diode 204 is coupled to the output terminal of comparator 202. The cathode of diode 204 is coupled to the + input terminal of an LM 324 comparator 206. The output terminal of comparator 206 is coupled through a 22 KΩ resistor to its − input terminal. The − input terminal of comparator 206 is also coupled to ground through a 0.047 µF capacitor. The output terminal of comparator 206 is also coupled through a series 20 KΩ tone potentiometer 208 and 22 KΩ resistor to the + input terminal of comparator 206. A 22 KΩ resistor is coupled between the + input terminal of comparator 206 and ground. The series combination of a 470 Ω resistor 210 and a 0.1 µF capacitor 212 is coupled between the output terminal of comparator 206 and ground.

The output terminal of comparator 202 is also coupled to the − input terminal of an LM 324 comparator 214. The + input terminal of comparator 214 is coupled through a 1 KΩ series resistor to the wiper of a 10 KΩ squelch adjusting potentiometer 216. Potentiometer 216 is coupled in series circuit between a 12 KΩ resistor 218 and a 2.7 KΩ resistor 220 which are coupled between +5 VDC and ground. A 1 MΩ feedback resistor is coupled between the output terminal of comparator 214 and its + input terminal. The output terminal of comparator 214 is coupled through a 10 KΩ resistor to the base of a type MMBT 3904 NPN transistor 222. The emitter of transistor 222 is grounded. The collector of transistor 222 is coupled to the + input terminal of comparator 168.

The output terminal of comparator 214 is also coupled through two series 4.7 KΩ resistors 224, 226 to the base of a type MMBT 3904 transistor 228. The emitter of transistor 228 is grounded. The collector of transistor 228 is coupled through a 100 KΩ resistor 229 to the common terminal of resistor 210 and capacitor 212. The collector of transistor 228 is also coupled through a series 0.1 μF capacitor 230 and 10 KΩ volume control potentiometer 232 to ground. The wiper of potentiometer 232 is coupled to the input terminal, pin 3, of a National Semiconductor type LM 386 audio amplifier 234. Pin 6 of amplifier 234 is coupled to +8.4 VDC supply. Pins 2 and 4 of amplifier 234 are coupled to ground. The output terminal, pin 5, of amplifier 234 is coupled to ground through the series combination of a 10 Ω resistor and a 0.047 μF capacitor, and to one terminal of a speaker 236 through the series combination of a 22 Ω resistor and a 330 μF capacitor. The other terminal of speaker 236 is coupled to ground.

The output terminal of buffer 156 is also coupled through a 1 μF capacitor to the + input terminal of a type LM 324 comparator 240 which is configured as an amplifer. A resistive voltage divider including a 1 MΩ resistor 242 and a 47 KΩ resistor 244 is coupled between +5 VDC and ground. The common terminal of resistors 242 and 244 is coupled to the + input terminal of comparator 240. Feedback is provided from the output terminal of comparator 240 to its − input terminal through a parallel RC circuit including a 100 KΩ resistor and a 0.1 pF capacitor. A 10 KΩ resistor is coupled between the − input terminal of comparator 240 and ground.

The output terminal of comparator 240 is also coupled through a series 10 μF capacitor 245 and 25 KΩ resistor 246 to the $INV_A$ input terminal, pin 4, of a Linear Technology type LTC 1060 switched capacitor filter 248 which functions as a very narrow bandpass filter whose center frequency is tuned to the frequency of oscillator 42. Pin 4 of switched capacitor filter 248 is coupled through a 27 KΩ resistor to the $BP_A$ terminal, pin 2, thereof, and through a 1 KΩ resistor to the $N/AP/HP_A$ terminal, pin 3, thereof. The $S_{A/B}$, $V_A+$ and $V_D+$ terminals, pins 6–8, respectively, of switched capacitor filter 248 are coupled to +5 VDC. The LSh terminal, pin 9, thereof is coupled to ground.

The $S1_A$ and $S1_B$ terminals, pins 5 and 16, respectively, of switched capacitor filter 248 are supplied a +2.5 VDC reference level from a 2.5 V reference source including an LM 324 comparator 250 in unity gain buffer configuration. A voltage divider including 10 KΩ resistors 252, 254 is coupled between +5 VDC and ground. A 1 μF capacitor is coupled across resistor 254. The common terminal of resistors 252, 254 is coupled to the + input terminal of comparator 250. This +2.5 VDC reference level is also provided to the AGrouND and 50/100/HOLD terminals, pins 15 and 12, respectively, of switched capacitor filter 248. The $V_A−$ and $V_D−$ terminals, pins 14 and 13, respectively, of filter 248 are coupled to ground. The $INV_B$ terminal, pin 17 of filter 248, is coupled through a 1 KΩ resistor to the $N/AP/HP_B$ terminal, pin 18, thereof, through a 27 KΩ resistor to the $BP_B$ terminal, pin 19, thereof, and through a 10 KΩ resistor to the $BP_A$ terminal thereof.

A 1 KHz oscillator comprising an LM 324 comparator 258 is coupled to the $CLocK_A$ and $CLocK_B$ input terminals, pins 10 and 11, respectively, of switched capacitor filter 248. A series resistive voltage divider comprising two 22 KΩ resistors 260, 262 is coupled between +8.4 VDC and ground. The common terminal of resistors 260, 262 is coupled to the + input terminal of comparator 258. A 22 KΩ feedback resistor is coupled between the output terminal of comparator 258 and its + input terminal. Series 10 KΩ frequency adjusting potentiometer 264 and 4.7 KΩ resistor 266 are coupled between the output terminal of comparator 258 and its − input terminal. A 0.1 μF capacitor is coupled between the − input terminal of comparator 258 and ground. The cathode of a type 1N914 diode is coupled to the output terminal of comparator 258. Its anode is coupled to the $CLK_A$ and $CLK_B$ terminals of filter 248 and through a 10 KΩ pull-down resistor to +5 VDC.

The +2.5 VDC reference established at the output terminal of comparator 250 is coupled through a 100 KΩ resistor 268 to the + input terminal of an LM 324 comparator 270 in a peak detector circuit which converts the output of filter 248 to an equivalent DC level. The $BP_B$ terminal of filter 248 is coupled through a 10 μF capacitor to the + input terminal of comparator 270. The output terminal of comparator 270 is coupled to the anode of a 1N914 diode, the cathode of which is coupled through a 470 Ω resistor to the − input terminal of comparator 270. A parallel RC circuit including a 1 MΩ resistor and a 10 μF capacitor is coupled between the − input terminal of comparator 270 and ground. The +2.5 VDC reference at the output terminal of comparator 250 is also coupled through a series 10 KΩ potentiometer 272, which sets the peak threshold, and 10 KΩ resistor 274 to +5 VDC. The wiper of potentiometer 272 is coupled to the + input terminal of an LM 324 comparator 276. The − input terminal of comparator 276 is coupled to the − input terminal of comparator 270. Comparator 276 is configured to compare the equivalent DC level output of peak detector comparator 270 to a threshold level set by potentiometer 272. Thus the presence of an equivalent DC level indicative of oscillator 42 frequency signal above a certain threshold produces a low level on the output of comparator 276. The output terminal of comparator 276 is coupled to its + input terminal through a 100 KΩ feedback resistor, and through series 4.7 KΩ resistors 278, 280 to the base of transistor 228.

The audio signal generated at the output terminal of comparator 206 appears across resistors 210, 229, capacitor 230 and volume control potentiometer 232. The oscillator 42 frequency is recovered by the switched capacitor filter 248 from the signal coupled to switched capacitor filter 248 through IC 150, comparator 156 and comparator 240. This signal is also applied to VCO 206 and modulates the audio signal appearing across components 210, 229, 230 and 232. This low frequency modulation is readily identifiable in the audio output of speaker 236 and identifies system 8 as the RF leakage source.

Power for the illustrated detector system is provided by a 9 V battery 300 through a switch 302 to a National Semiconductor type 78L05+5 VDC regulator integrated circuit 304. +8.4 VDC for the detector is taken from the input terminal (pin 8) side of regulator 304. +5 VDC for the detector appears on the output terminal, pin 1, of the regulator 304. A system is also provided for recovering energy from received signals. The remaining terminal of inductor 76 is coupled to an input terminal, pin 8, of a National Semiconductor type LP 2951 voltage regulator integrated circuit 308. Rectified 74 and filtered 76, 80 but otherwise unregulated +VDC is applied to pin 8 of regulator 308. Regulated +5 VDC is provided at the output terminal, pin 1, of regulator 308 through a 1N4148 diode 310 and 22 Ω charging resistor 312 when current is flowing in an LED 314 in the input circuit to regulator 308. A series string of an 82 KΩ resistor 316, a 5.6 KΩ resistor 318 and a 10 KΩ resistor 320 programs regulator 308.

What is claimed is:

1. In a communication circuit comprising at least one source of program material, at least one modulator, a carrier frequency signal source for each of the modulators, means for coupling the program material sources to the modulators, means for coupling the program material-modulated carrier frequencies in the circuit, terminal apparatus for demodulating at least one of the program material-modulated carrier frequency signals, the terminal apparatus including automatic gain control (AGC) means having an AGC bandwidth, and means for coupling the terminal apparatus to the circuit, the improvement wherein the means for coupling one of the program material-modulated carrier frequencies in the circuit comprises a variable attenuator having a control input, a program material-modulated carrier frequency input, and a variably attenuated, program material-modulated carrier frequency output, an oscillator for generating at an oscillator output a signal having a frequency within the AGC bandwidth, means for coupling said one of the program material modulated carrier frequencies to the program material-modulated carrier frequency input, means for coupling the oscillator output to the control input, and means for coupling the variably attenuated, program material-modulated carrier frequency output in the circuit.

2. The improvement of claim 1 wherein the oscillator output signal frequency is less than about 35 Hz.

3. The improvement of claim 2 wherein the oscillator output signal frequency is in the range of from about 5 Hz to about 15 Hz.

4. The improvement of claim 1 further comprising a detector for receiving a signal representative of leakage from the communication circuit, for extracting from the signal representative of the leakage the variably attenuated, program material-modulated carrier frequency, for detecting in the variably attenuated, program material-modulated carrier frequency the oscillator output signal frequency, and for producing an indication of detection of the oscillator output signal frequency.

5. The improvement of claim 4 wherein the oscillator output signal frequency is less than about 35 Hz.

6. The improvement of claim 5 wherein the oscillator output signal frequency is in the range of from about 5 Hz to about 15 Hz.

7. The improvement of claim 1, 2, 3, 4, 5 or 6 wherein the communication circuit comprises a CATV circuit and the terminal apparatus comprises at least one television receiver.

8. In a communication circuit, a method comprising the steps of providing at least one source of program material, providing at least one modulator, providing a carrier frequency signal source for each of the modulators, coupling the program material sources to the modulators, coupling the program material-modulated carrier frequencies in the circuit, providing terminal apparatus for demodulating at least one of the program material-modulated carrier frequency signals, the terminal apparatus including automatic gain control (AGC) means having an AGC bandwidth, and coupling the terminal apparatus to the circuit, the improvement comprising the steps of coupling one of the program material-modulated carrier frequencies in the circuit through a variable attenuator having a control input, a program material-modulated carrier frequency input, and a variably attenuated, program material-modulated carrier frequency output, providing an oscillator for generating at an oscillator output a signal having a frequency within the AGC bandwidth, coupling said one of the program material modulated carrier frequencies to the program material-modulated carrier frequency input, coupling the oscillator output to the control input, and coupling the variably attenuated, program material-modulated carrier frequency output in the circuit.

9. The improvement of claim 8 wherein the step of providing an oscillator comprises the step of providing an oscillator having an oscillator output signal frequency less than about 35 Hz.

10. The improvement of claim 9 wherein the step of providing an oscillator comprises the step of providing an oscillator having an oscillator output signal frequency in the range of from about 5 Hz to about 15 Hz.

11. The improvement of claim 8 further comprising providing a detector for receiving a signal representative of leakage from the communication circuit, for extracting from the signal representative of the leakage the variably attenuated, program material-modulated carrier frequency, for detecting in the variably attenuated, program material-modulated carrier frequency the oscillator output signal frequency, and for producing an indication of detection of the oscillator output signal frequency.

12. The improvement of claim 11 wherein the step of providing an oscillator comprises the step of providing an oscillator having an oscillator output signal frequency less than about 35 Hz.

13. The improvement of claim 12 wherein the step of providing an oscillator comprises the step of providing an oscillator having an oscillator output signal frequency in the range of from about 5 Hz to about 15 Hz.

14. The improvement of claim 8, 9, 10, 11, 12 or 13 wherein the communication circuit comprises a CATV circuit and the step of providing terminal apparatus comprises the step of providing at least one television receiver.

15. In a communication circuit comprising at least one source of program material, at least one modulator, a carrier frequency signal source for each of the modulators, means for coupling the program material sources to the modulators, means for coupling the carrier frequency signal sources to the modulators, means for coupling the program material-modulated carrier frequencies in the circuit, terminal apparatus for demodulating at least one of the program material-modulated carrier frequency signals, the terminal apparatus including automatic gain control (AGC) means having an AGC bandwidth, and means for coupling the terminal apparatus to the circuit, the improvement wherein the means for coupling one of the program material-modulated carrier frequencies in the circuit comprises an amplitude modulator having a control input, a program material-modulated carrier frequency input, and an amplitude modulated, program material-modulated carrier frequency output, an oscillator for generating at an oscillator output a signal having a frequency within the AGC bandwidth, means for coupling said one of the program material modulated carrier frequencies to the program material-modulated carrier frequency input, means for coupling the oscillator output to the control input, and means for coupling the amplitude modulated, program material-modulated carrier frequency output in the circuit.

16. The improvement of claim 15 wherein the oscillator output signal frequency is less than about 35 Hz.

17. The improvement of claim 16 wherein the oscillator output signal frequency is in the range of from about 5 Hz to about 15 Hz.

18. The improvement of claim 15 further comprising a detector for receiving a signal representative of leakage from the communication circuit, for extracting from the signal representative of the leakage the amplitude modulated, program material-modulated carrier frequency, for detecting in the amplitude modulated, program material-modulated carrier frequency the oscillator output signal frequency, and for producing an indication of detection of the oscillator output signal frequency.

19. The improvement of claim 18 wherein the oscillator output signal frequency is less than about 35 Hz.

20. The improvement of claim 19 wherein the oscillator output signal frequency is in the range of from about 5 Hz to about 15 Hz.

21. The improvement of claim 15, 16, 17, 18, 19 or 20 wherein the communication circuit comprises a CATV circuit and the terminal apparatus comprises at least one television receiver.

22. In a communication circuit, a method comprising the steps of providing at least one source of program material, at least one modulator, a source of carrier frequency signals for each of the modulators, coupling the program material sources to the modulators, coupling the program material-modulated carrier frequencies in the circuit, providing terminal apparatus for demodulating at least one of the program material-modulated carrier frequency signals, the terminal apparatus including automatic gain control (AGC) means having an AGC bandwidth, and coupling the terminal apparatus to the circuit, the improvement comprising the steps of coupling one of the program material-modulated carrier frequencies in the circuit through an amplitude modulator having a control input, a program material-modulated carrier frequency input, and an amplitude modulated, program material-modulated carrier frequency output, providing an oscillator for generating at an oscillator output a signal having a frequency within the AGC bandwidth, coupling said one of the program material modulated carrier frequencies to the program material-modulated carrier frequency input, coupling the oscillator output to the control input, and coupling the amplitude modulated, program material-modulated carrier frequency output in the circuit.

23. The improvement of claim 22 wherein the step of providing an oscillator comprises the step of providing an oscillator having an oscillator output signal frequency less than about 35 Hz.

24. The improvement of claim 23 wherein the step of providing an oscillator comprises the step of providing an oscillator having an oscillator output signal frequency in the range of from about 5 Hz to about 15 Hz.

25. The improvement of claim 22 further comprising providing a detector for receiving a signal representative of leakage from the communication circuit, for extracting from the signal representative of the leakage the amplitude modulated, program material-modulated carrier frequency, for detecting in the amplitude modulated, program material-modulated carrier frequency the oscillator output signal frequency, and for producing an indication of detection of the oscillator output signal frequency.

26. The improvement of claim 25 wherein the step of providing an oscillator comprises the step of providing an oscillator having an oscillator output signal frequency less than about 35 Hz.

27. The improvement of claim 26 wherein the step of providing an oscillator comprises the step of providing an oscillator having an oscillator output signal frequency in the range of from about 5 Hz to about 15 Hz.

28. The improvement of claim 22, 23, 24, 25, 26 or 27 wherein the communication circuit comprises a CATV circuit and the step of providing terminal apparatus comprises the step of providing at least one television receiver.

* * * * *